United States Patent
Monbarren et al.

(10) Patent No.: US 9,051,092 B1
(45) Date of Patent: Jun. 9, 2015

(54) REUSABLE BOTTLE CAP

(71) Applicants: Marty Monbarren, Zephyrhills, FL (US); Kenten Monbarren, San Antonio, FL (US)

(72) Inventors: Marty Monbarren, Zephyrhills, FL (US); Kenten Monbarren, San Antonio, FL (US)

( * ) Notice: Subject to any disclaimer, the term of this patent is extended or adjusted under 35 U.S.C. 154(b) by 0 days.

(21) Appl. No.: 14/093,554

(22) Filed: Dec. 2, 2013

(51) Int. Cl.
*B65D 41/00* (2006.01)
*B65D 41/04* (2006.01)

(52) U.S. Cl.
CPC .................. *B65D 41/0428* (2013.01)

(58) Field of Classification Search
CPC ........... B65D 41/0428; B65D 41/0435; B65D 41/0442; B65D 41/045; B65D 47/123
USPC ......... 215/228, 240, 319, 236, 237, 238, 239, 215/361, 329, 306, 243
See application file for complete search history.

(56) References Cited

U.S. PATENT DOCUMENTS

| | | | | |
|---|---|---|---|---|
| 3,090,531 A * | 5/1963 | Weaver et al. | ................. | 222/545 |
| 3,235,117 A * | 2/1966 | Mason, Jr. | ................... | 215/256 |
| 3,288,320 A * | 11/1966 | Swanson | ........................ | 215/321 |
| 3,656,668 A * | 4/1972 | Liebertz | ........................ | 222/570 |
| 3,850,328 A * | 11/1974 | Guala | ............................ | 215/252 |
| 5,853,093 A * | 12/1998 | Neiger | ............................ | 215/237 |
| 5,944,207 A * | 8/1999 | Reidenbach | .................. | 215/243 |
| 6,253,937 B1 * | 7/2001 | Anderson | ..................... | 215/235 |
| 6,390,315 B1 * | 5/2002 | Giddings et al. | .............. | 215/235 |
| 6,394,323 B2 * | 5/2002 | McClean et al. | .............. | 222/534 |
| 2004/0045967 A1 * | 3/2004 | Becker et al. | ................. | 220/288 |
| 2006/0278642 A1 * | 12/2006 | Pugne et al. | ............... | 220/256.1 |
| 2009/0134188 A1 * | 5/2009 | Wilson et al. | ................ | 222/571 |
| 2012/0074091 A1 * | 3/2012 | Himelstein | .................. | 215/12.2 |
| 2014/0263154 A1 * | 9/2014 | Musumeci, Jr. | ............. | 215/250 |
| 2014/0263453 A1 * | 9/2014 | Haley et al. | ................... | 222/152 |

* cited by examiner

*Primary Examiner* — Anthony Stashick
*Assistant Examiner* — Ernesto Grano
(74) *Attorney, Agent, or Firm* — Edward P Dutkievicz

(57) ABSTRACT

A reusable bottle cap, comprising a lower bottle attaching component, a threaded connector, an upper cap component having a lower collar portion and an upper lid portion, and a living hinge connecting the upper cap component lower collar portion and the upper cap component upper lid portion.

4 Claims, 4 Drawing Sheets

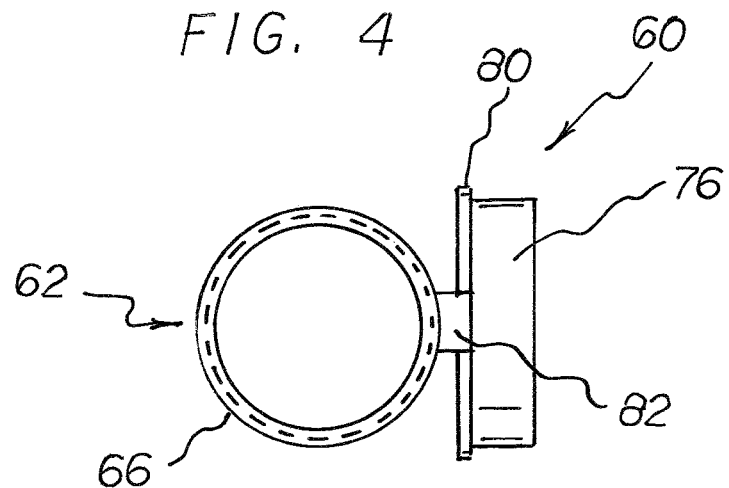
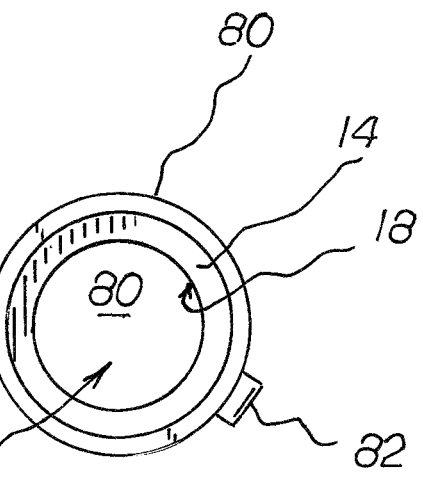

REUSABLE BOTTLE CAP

The Applicants have not submitted a related pending or patented non-provisional application within two months of the filing date of this present application. The invention is made by two inventors, and both inventors are disclosed. This application is not under assignment to any other person or entity at this time.

BACKGROUND OF THE INVENTION

1. Field of the Invention

The present invention relates to a Reusable Bottle Cap and more particularly pertains to a device used to reseal or cap an opened bottle.

2. Description of the Prior Art

The use of devices to recap or reseal an opened bottle is known in the prior art. More specifically, devices to recap or reseal an opened bottle previously devised and utilized for the purpose of resealing opened bottles are known to consist basically of familiar, expected, and obvious structural configurations, notwithstanding the designs encompassed by the prior art which has been developed for the fulfillment of the objectives and requirements.

While the prior art devices fulfill their respective, particular objectives and requirements, the prior art does not describe Reusable Bottle Cap that allows a device to reseal or cap an opened bottle.

In this respect, the Reusable Bottle Cap, according to the present invention, substantially departs from the conventional concepts and designs of the prior art, and in doing so provides an apparatus primarily developed for the purpose of allowing a user to reseal or cap an opened bottle.

Therefore, it can be appreciated that there exists a continuing need for a new and improved Reusable Bottle Cap which can be used for a device to reseal or cap an opened bottle. In this regard, the present invention substantially fulfills this need.

SUMMARY OF THE INVENTION

In view of the foregoing disadvantages inherent in the known types of devices to recap or reseal an opened bottle now present in the prior art, the present invention provides an improved Reusable Bottle Cap. As such, the general purpose of the present invention, which will be described subsequently in greater detail, is to provide a new and improved Reusable Bottle Cap which has all the advantages of the prior art and none of the disadvantages.

In describing this invention, the word "coupled" is used. By "coupled" is meant that the article or structure referred to is joined, either directly, or indirectly, to another article or structure. By "indirectly joined" is meant that there may be an intervening article or structure imposed between the two articles which are "coupled". "Directly joined" means that the two articles or structures are in contact with one another or are essentially continuous with one another.

By adjacent to a structure is meant that the location is near the identified structure.

The present invention essentially comprises a reusable bottle cap, comprises several components, in combination.

There is a lower bottle attaching component. The lower bottle attaching component is fabricated of a resilient distensible material, such as rubber or other elastomeric material which can hold a shape. The lower bottle attaching component has a lower end and a upper end, with a length there between. The lower bottle attaching component has an inner surface and an outer surface, with a wall thickness there between.

The lower bottle attaching component has a generally hollow tubular configuration, with an internal passageway there through. The lower end of the lower bottle attaching component has a generally rounded configuration with a first internal diameter and a first external diameter. The lower end of the lower bottle attaching component has an internal groove. The internal groove of the lower bottle attaching component has a second internal diameter. The second internal diameter is larger than the first internal diameter.

The upper end of the lower bottle attaching component has a internal female thread. The lower bottle attaching component upper end has a first external diameter and first internal diameter portion.

There is a threaded connector. The threaded connector is fabricated of a rigid material, such as plastic. The threaded connector having an upper end and a lower end, with a length there between. The threaded connector has an inner surface and an outer surface, with a wall thickness there between.

The threaded connector has a generally hollow tubular configuration, with a passageway there through. The threaded connector has an external male thread. The male thread of the threaded connector is sized to mate with, and be received by, the internal female thread of the upper end of the lower bottle attaching component.

There is an upper cap component. The upper cap component is fabricated of a resilient, flexible material. The upper cap component has a lower collar portion and an upper lid portion. The upper cap component loser collar portion has a generally hollow tubular configuration, with a second external diameter and a third internal diameter. The second external diameter is less than the first internal diameter, and the third internal diameter is less than the second internal diameter.

The upper cap component lower collar portion has a lower end and an upper end, with a length there between. The upper cap component lower collar portion has an external surface and an internal surface, with a wall thickness there between. The internal surface of the upper cap component lower collar portion has an internal female thread. The internal female thread of the upper cap component loser collar portion is sized to mate with, and receive, the external male thread of the threaded connector. The upper cap component upper lid portion is fabricated of a rigid material, such as a plastic.

The upper lid portion has a stepped external surface and a hollow internal surface forming a generally rounded recess. The stepped external surface of the upper cap component upper lid portion forms a flange. The internal surface of the upper lid portion has a having fourth internal diameter. The fourth internal diameter is greater than the second external diameter.

Lastly, there is a living hinge. The living hinge is fabricated of the resilient flexible material. The living hinge connects the upper cap component lower collar portion and the upper cap component upper lid portion.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved Reusable Bottle Cap which has all of the advantages of the prior art devices to recap or reseal an opened bottle and none of the disadvantages. In this application the terms "cap" and "recap" are used interchangeably, and are intended to mean the placing and retention of a cap on a bottle.

It is another object of the present invention to provide a new and improved Reusable Bottle Cap which may be easily and efficiently manufactured and marketed.

It is further object of the present invention to provide a new and improved Reusable Bottle Cap which is of durable and reliable constructions.

An even further object of the present invention is to provide a new and improved Reusable Bottle Cap which is susceptible of a low cost of manufacture with regard to both materials and labor, and which accordingly is then susceptible of low prices of sale to the consuming public, thereby making such Reusable Bottle Cap economically available to the buying public.

Even still another object of the present invention is to provide a Reusable Bottle Cap for a device to reseal or cap an opened bottle.

Lastly, it is an object of the present invention to provide a new and improved Reusable Bottle Cap, comprising a lower bottle attaching component, a threaded connector, an upper cap component having a lower collar portion and an upper lid portion, and a living hinge connecting the upper cap component lower collar portion and the upper cap component upper lid portion.

It should be understood that while the above-stated objects are goals which are sought to be achieved, such objects should not be construed as limiting or diminishing the scope of the claims herein made.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a view taken along line 4-4 of FIG. 3.

FIG. 5 is a view taken along line 5-5 of FIG. 3.

The same reference numerals refer to the same parts throughout the various Figures.

DESCRIPTION OF THE PREFERRED EMBODIMENT

Figures 1, 2:
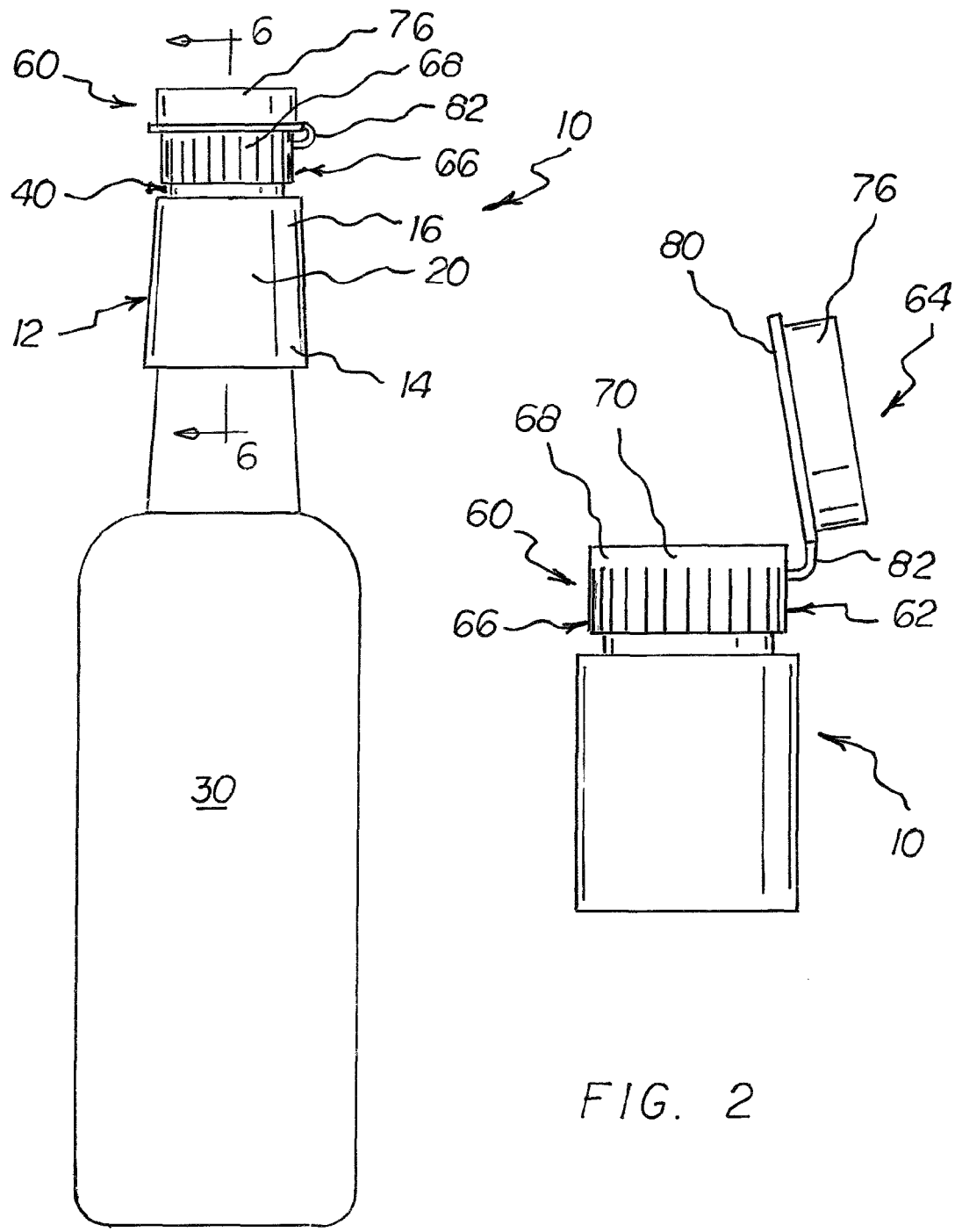
FIG. 1 is a side elevational view of the Reusable Bottle Cap in place on an existing bottle. The cap is in a closed orientation and seals the bottle.
FIG. 2 is a close up view of the Reusable Bottle Cap, without the presence of the bottle. The upper lid portion of the upper cap component is in an open orientation.
Figure 3:
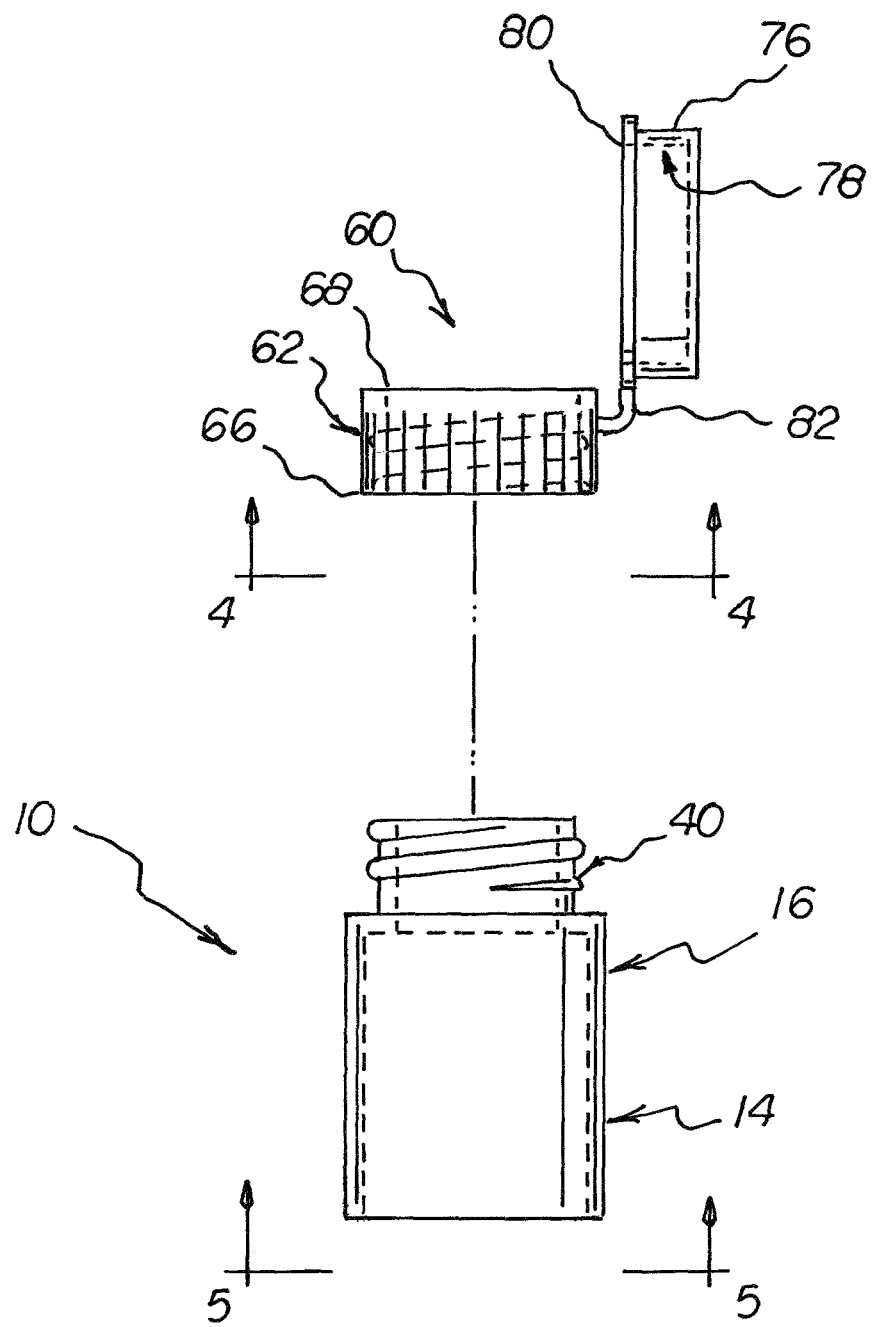
FIG. 3 is side elevational view of the Reusuable Bottle Cap with the upper cap component remote from the lower bottle attaching component.

With reference now to the drawings, and in particular to FIG. 1 thereof, the preferred embodiment of the new and improved Reusable Bottle Cap embodying the principles and concepts of the present invention and generally designated by the reference numeral 10 will be described.

The present invention, the Reusable Bottle Cap 10 is comprised of a plurality of components. Such components in their broadest context include a lower bottle attaching component, a threaded connector, and an upper lid component. Such components are individually configured and correlated with respect to each other so as to attain the desired objective.

A reusable bottle cap 10, comprises several components, in combination.

There is a lower bottle attaching component 12. The lower bottle attaching component is fabricated of a resilient distensible material, such as rubber or other elastomeric material which can hold a shape. The lower bottle attaching component has a lower end 14 and a upper end 16, with a length there between. The lower bottle attaching component has an inner surface 18 and an outer surface 20, with a wall thickness there between.

The lower bottle attaching component has a generally hollow tubular configuration, with an internal passageway 22 there through. The lower end of the lower bottle attaching component has a generally rounded configuration with a first internal diameter and a first external diameter. The lower end of the lower bottle attaching component has an internal groove 24. The internal groove of the lower bottle attaching component has a second internal diameter. The second internal diameter is larger than the first internal diameter. The internal groove of the lower bottle attaching component is configured to mate with and receive a lip which exists on an existing bottle 30, such as a water bottle, soft drink bottle, or beer bottle.

The upper end of the lower bottle attaching component has a internal female thread 32. The lower bottle attaching component upper end has a first external diameter and first internal diameter portion.

There is a threaded connector 40. The threaded connector is fabricated of a rigid material, such as plastic. The threaded connector having an upper end 42 and a lower end 44, with a length there between. The threaded connector has an inner surface 46 and an outer surface 48, with a wall thickness there between.

The threaded connector has a generally hollow tubular configuration, with a passageway 50 there through. The threaded connector has an external male thread 52. The male thread of the threaded connector is sized to mate with, and be received by, the internal female thread of the upper end of the lower bottle attaching component.

There is an upper cap component 60. The upper cap component is fabricated of a resilient, flexible material. The upper cap component has a lower collar portion 62 and an upper lid portion 64. The upper cap component loser collar portion has a generally hollow tubular configuration, with a second external diameter and a third internal diameter. The second external diameter is less than the first internal diameter, and the third internal diameter is less than the second internal diameter.

The upper cap component lower collar portion has a lower end 66 and an upper end 68, with a length there between. The upper cap component lower collar portion has an external surface 70 and an internal surface 72, with a wall thickness there between. The internal surface of the upper cap component lower collar portion has an internal female thread 74. The internal female thread of the upper cap component loser collar portion is sized to mate with, and receive, the external male thread of the threaded connector. The upper cap component upper lid portion is fabricated of a resilient, flexible material, such as a plastic.

The upper lid portion has a stepped external surface 76 and a hollow internal surface 78 forming a generally rounded recess. The stepped external surface of the upper cap component upper lid portion forms a flange 80. The internal surface of the upper lid portion has a having fourth internal diameter. The fourth internal diameter is greater than the second external diameter.

Lastly, there is a living hinge 82. The living hinge is fabricated of the resilient flexible material. The living hinge connects the upper cap component lower collar portion and the upper cap component upper lid portion.

Figures 6, 7:
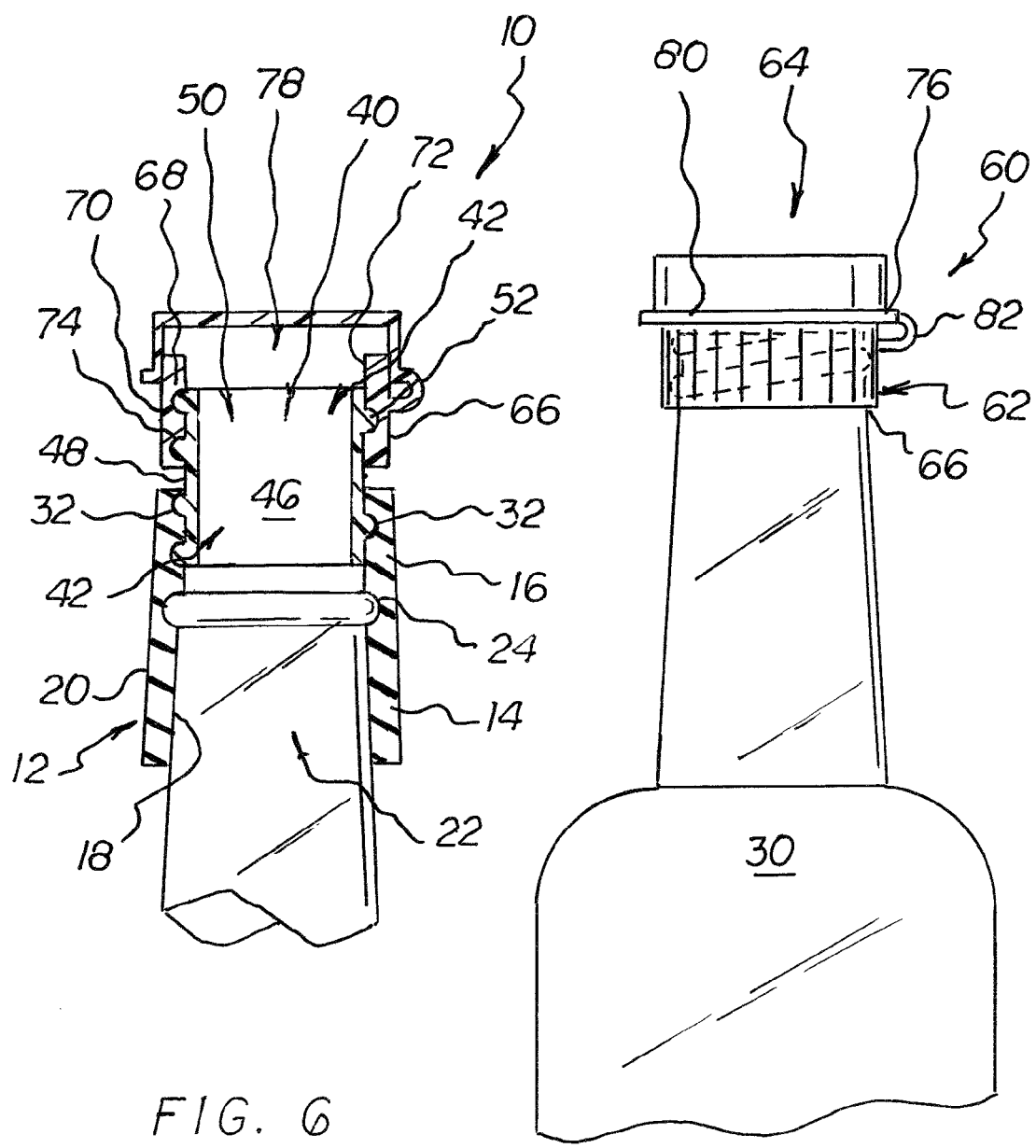
FIG. 6 is a cross sectional view of the Reusable Bottle Cap taken along line 6-6 of FIG. 1, with the Reusable Bottle Cap in place on an existing bottle. The upper lid portion of the upper cap component is in the closed orientation.
FIG. 7 is a side elevational view of the upper cap component being threadely coupled to an existing bottle.

In use, a user opens a bottle of a selected beverage. The flexible, resilient lower component is slipped over the neck of the bottle. Generally bottles have a lip on the upper end of the bottle neck, as shown in FIG. 6. The bottle lip engages groove 24 and forms a retainer and seal for the bottle cap. The threaded connector attached the lower bottle attaching component with the upper cap component. The upper lid portion is then placed in the closed position, allowing the bottle to be carried, with a lessened chance of bottle contents spilling.

In some instances, the upper cap component thread may be the same as the thread on an existing bottle. In this instance a user may elect to use the upper cap component, as shown in FIG. 7, without using the bottle attaching component.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A reusable bottle cap, comprising, in combination:
    a lower bottle attaching component having a lower end and a upper end with a length there between, the lower bottle attaching component having an inner surface and an outer surface and a wall thickness there between, the lower bottle attaching component having a generally hollow tubular configuration with an internal passageway there through, the lower end of the lower bottle attaching component having a generally rounded configuration with a first internal diameter and a first external diameter, the lower end of the lower bottle attaching component having an internal groove having a second internal diameter, the upper end of the lower bottle attaching component having an internal female thread;
    a threaded connector having an upper end and a lower end with a length there between, the threaded connector being coupled to the upper end of the lower bottle attaching component, the threaded connector having an inner surface and an outer surface with a wall thickness there between, the threaded connector having a generally hollow tubular configuration with a passageway there through, the threaded connector having an external male thread;
    an upper cap component having a lower collar portion and an upper lid portion, the lower collar portion of the upper cap component being coupled to the upper end of the threaded connector, the upper cap component lower collar portion having a lower end and an upper end with a length there between, the upper cap component lower collar portion having an external surface and an internal surface with a wall thickness there between, the upper cap component lower collar portion having a generally hollow tubular configuration with a second external diameter and a third internal diameter, the second external diameter being less than the first internal diameter and the third internal diameter being less than the second internal diameter, the internal surface of the upper cap component lower collar portion having an internal female thread, the internal female thread of the upper cap component lower collar portion being sized to mate with and receive the external male thread of the threaded connector; and,
    a living hinge connecting the upper cap component lower collar portion and the upper cap component upper lid portion.

2. The reusable bottle cap as described in claim 1, with the reusable bottle cap further comprising:
    the lower bottle attaching component upper end having a first external diameter and first internal diameter portion, the second internal diameter being larger than the first internal diameter;
    the male thread of the threaded connector sized to mate with and be received by the internal female thread of the upper end of the lower bottle attaching component; and
    the upper lid portion having a stepped external surface and a hollow internal surface forming a generally rounded recess.

3. The reusable bottle cap as described in claim 2, with the reusable bottle cap further comprising:
    lower bottle attaching component with the lower bottle attaching component being fabricated of a resilient distensible material;
    the threaded connector being fabricated of a rigid material;

the upper cap component being fabricated of a first resilient flexible material;
the upper cap component upper lid portion being fabricated of the first resilient flexible material; and
the stepped external surface of the upper cap component upper lid portion forming a flange.

4. The reusable bottle cap as described in claim 3, with the reusable bottle cap further comprising the internal surface of the upper lid portion having a having fourth internal diameter, with the fourth internal diameter being greater than the second external diameter.

\* \* \* \* \*